United States Patent [19]
Kell et al.

[11] Patent Number: 4,990,906
[45] Date of Patent: Feb. 5, 1991

[54] PROGRAMMABLE VEHICLE ANTI-THEFT SYSTEM

[75] Inventors: Curtis N. Kell, Flora, Ind.; R. Clark Griffin, Dayton, Ohio; John M. Dikeman, Kokomo, Ind.; Mario D. Nemirovsky, Goleta, Calif.

[73] Assignee: Delco Electronics Corporation, Kokoma, Ind.

[21] Appl. No.: 277,276

[22] Filed: Nov. 29, 1988

[51] Int. Cl.$^5$ ............................................. H04B 1/00
[52] U.S. Cl. ..................... 340/825.310; 340/825.320; 340/825.340
[58] Field of Search ..................... 340/825.31, 825.34, 340/825.32, 426, 430, 825.69, 825.72; 307/10 AT, 10.2, 10.5; 361/172; 70/277, 278; 180/287; 123/146.5 B; 235/382, 382.5

[56] References Cited
U.S. PATENT DOCUMENTS

| | | | |
|---|---|---|---|
| 4,148,372 | 4/1979 | Schroeder | 123/146.5 B |
| 4,438,426 | 3/1984 | Adkins | 340/825.32 |
| 4,672,225 | 6/1987 | Hanisko et al. | 361/172 |
| 4,713,660 | 12/1987 | Camenzind | 340/825.69 |
| 4,755,815 | 7/1988 | Savoyet et al. | 340/825.32 |
| 4,791,280 | 12/1988 | O'Connell et al. | 235/382 |
| 4,804,856 | 2/1989 | Hanisko et al. | 180/287 |

Primary Examiner—Donald J. Yusko
Assistant Examiner—Dervis Magistre
Attorney, Agent, or Firm—Albert F. Duke

[57] ABSTRACT

A vehicle anti-theft device is disclosed which includes an electronically erasable programmable read only memory (EEPROM) which stores a modifiable code which must be matched by an input code in order to start the vehicle. The ignition key includes a resistor pellet, engaged by contact in the ignition lock assembly, which is measured to provide the input code. To avoid problems associated with intermittent contact engagement with the resistor pellet, circuitry is provided to control the resistor measurement cycle.

10 Claims, 6 Drawing Sheets

PROGRAMMABLE VEHICLE ANTI-THEFT SYSTEM

FIELD OF THE INVENTION

This invention relates generally to a driver identification type security device that uses a separate code in addition to the mechanical code provided by the ignition key to determine if the driver should be permitted to start the vehicle. More particularly this invention relates to improvements in anti-theft systems of the type disclosed in Schroeder U.S. Pat. No. 4,148,372 and Kaplit U.S. Pat. No. 4,144,523, assigned to the assignee of the present invention, wherein a separate identification code is associated with the ignition key to control whether the vehicle may be started. Further, the present invention relates to such an anti-theft system including a programmable memory device which may under certain conditions be programmed to a new code without adversely affecting the security of the system while at the same time permitting testing of the programmable memory device through multiple programming sequences prior to delivery of the vehicle to the purchaser. In certain circumstances, it is also desirable to permit reprogramming of the system after delivery to the purchaser.

BACKGROUND OF THE INVENTION

In Schroeder U.S. Pat. No. 4,148,372 the correct value of a resistor pellet, to be installed in the ignition key, was determined, during the last stages of vehicle assembly, by measuring the value of resistance in a bridge circuit contained in the electronic anti-theft controller located remotely from the ignition lock. In other words, it was necessary to match the correct key with the previously installed anti theft controller. Further, since the resistor is engaged by mechanical contacts located in the ignition lock assembly, it is possible for the rightful owner to be locked out of the vehicle due to intermittent opening of the contacts during operation of the ignition lock assembly. In Kaplit U.S. Pat. No. 4,144,523 a digital key assembly is provided which includes a programmable read only memory which is automatically programmed with the code for unlocking the system during initial removal of the key from the lock. However, the memory cannot be subsequently reprogrammed.

SUMMARY OF THE INVENTION

In accordance with the present invention the matching of key code with memory code is considerably simplified by permitting the key code to be programmed into the controller during vehicle assembly and also, under certain predefined circumstances, permitting the memory code to be changed by the user. Furthermore, where a pellet resistor is used as the key code, intermittent contact loss is detected and circuitry is provided for holding a valid voltage during such contact loss to prevent inadvertent lock out.

In accordance with the present invention, when a driver enters the vehicle, places the special ignition key in the ignition lock cylinder and turns the lock mechanism to the RUN position, the controller senses that the ignition circuit is turned on and measures the resistor in the ignition key. If the measured value of resistance matches a pre-programmed value stored in the controller, a relay is enabled which allows the starter to crank the engine. The controller also sends a signal to the Electronic Control Module (ECM) to indicate that the security "match" has been made and fuel can be delivered to the engine.

This complete sequence of events is transparent to the driver and takes less than 0.1 second to energize the start and fuel delivery circuits after the ignition is turned on and the switch is placed in the RUN position. If the ignition is turned on and placed in the RUN position but the controller does not find a match then the start and fuel delivery circuits are not energized and a diagnostic lamp is energized to indicate a breach in security. When in this mode the vehicle will not start and the diagnostic lamp will remain on until the ignition is turned off. Once the ignition is turned off a two-minute timer is started within the module. The function of the two-minute timer is to lock out any further attempts to start the vehicle until a period of two minutes has elapsed. If the ignition is turned back on within the two-minute period the timer is reset and the vehicle is disabled for another period of two minutes regardless of whether or not the valid key was in the ignition lock cylinder. After the two-minute period has elapsed the ignition can be turned back on to make another attempt at starting the vehicle.

The controller includes a self-programming feature which allows it to be programmed to the first of any of 15 valid resistors it measures when the ignition key is inserted in the lock assembly and moved to the on position. This feature allows the car assembly plants to install the system in a car without matching the controller to the resistor in any particular ignition key. Once the controller is programmed to one of the 15 values of resistance it will normally only accept that value in the future. If the first value the controller measures in this mode is invalid the controller will stay in the "Self-Program" mode until it measures a valid value.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
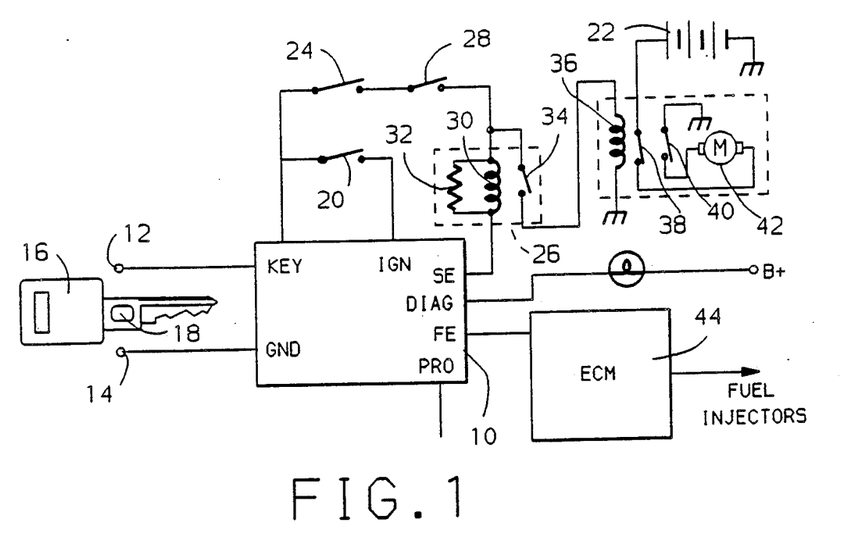
FIG. 1 is an overall block diagram of the system.

Referring now to the drawings and initially to FIG. 1, a block diagram of the invention is shown to include an anti theft controller 10 which receives an input from contacts 12, 14 located in the ignition lock, not shown. One such ignition lock contact assembly is shown in the aforementioned Schroeder patent. An ignition key 16 contains a resistor pellet adapted when fully inserted in the ignition lock to engage the contacts 12, 14. As is conventional, when the key 16 is moved to an "ignition" position it causes a switch 20 to be closed. Closure of the switch 20 is detected at the Ignition (IGN) input of controller 10. When the switch 20 is moved to a "start" position it closes a switch 24 connecting the battery 22 to a crank enable relay 26 through a Park/Neutral switch 28. The switch 28 closes whenever the transmission is in either the Park or Neutral position. The relay 26 includes a coil 30 and parallel connected resistor 32 connected connected between the switch 28 and the Starter Enable(SE) output pin of controller 10. The relay 26 when energized closes a switch connecting a starter motor relay 36 to the battery 22 via the switches 24, 28. The relay 36, when energized, closes switches 38, 40 connecting a starter motor 42 across the battery 22.

The controller 10 provides a Start Enable (SE) output used to energize a relay which allows for completion of the starter circuit. The controller 10 also provides a Fuel Enable (FE) output which switches to ground at a 30 Hz rate. This FE signal is used by the ECM 44 to enable fuel delivery to the engine. A Diagnostic Lamp (DIAG) output provides switch to ground control of a dash-mounted lamp 45. The SE, FE and DIAG outputs are only active when certain conditions are met as described more fully hereinafter.

After application of the ignition signal the controller 10 sets up the proper control sequences and then captures a predetermined number of discrete samples of the voltage developed across the key resistor 18. The controller 10 then compares these samples with a pre-programmed code in memory. If, for example, 112 or more of 208 samples compare with the code in memory the controller 10 determines that a "match" has been made. If the controller is in an unprogrammed state, a larger number for example, 192 or more of the 208 samples must compare with one of the 15 valid key codes before the new code is stored to memory.

The controller 10 contains logic for a two minute timeout feature which will disable the vehicle for a period of two minutes once activated. The timer is activated whenever an invalid ignition key is used to attempt to start the vehicle. If an invalid key is placed in the ignition and the ignition switch is placed in the RUN position the SE and FE outputs will remain disabled and the lamp 45 will be energized. When the ignition is turned off the two minute timer is started and any further attempts to start the vehicle will reset the timer for another two minutes. A valid attempt to start the vehicle can only be made after the ignition is switched low and two minutes has elapsed.

The controller 10 has special logic to allow it to be programmed, under predetermined conditions, to the first of the 15 valid key resistance values it measures after the rise of ignition. After this sequence is performed the controller will normally only accept that particular value of resistance.

The controller 10 retains the status of the last key (GOOD or BAD) it measured after the rise of ignition, in non-volatile memory. The purpose of this retention is to prevent cancellation of the two-minute timeout period by disconnecting the battery 22. If the battery 22 is disconnected and then reconnected and then the ignition is turned on the controller first checks this status flag. If the flag indicates the last key measured before the complete power-down was a "BAD key" the controller 10 immediately activates the two-minute timer.

Assuming that the controller 10 is programmed to one of the 15 valid key resistance values the normal operating sequence is as follows: Upon closure of the ignition switch 20 and the rise of the IGN input, the DIAG output is turned on for a period of approximately 2 seconds for a bulb check function. At the same time the diagnostic lamp output is turned on, the controller 10 measures the resistance value of the ignition key pellet 18.

After this read cycle the measured value is converted to a digital number and compared to another number stored in the controller's non-volatile memory. If the two numbers match the controller enables the SE and FE outputs. If the two numbers do not match the diagnostic lamp 45 remains enabled and the SE and FE outputs are not enabled. When IGN is switched low and the numbers did not match the two-minute lockout timer is started to lockout further attempts at starting the vehicle for a period of two minutes. If IGN is switched high within this two-minute period the timer is reset to two-minutes regardless of whether or not the proper key is in the ignition lock and starts counting after the ignition line is switched low again. If the two minute wait period is not met the system will never allow the vehicle to start. This could turn into an infinite loop if the proper conditions are not met. After two-minutes have elapsed another attempt can be made to start the vehicle.

In order to reprogram the controller 10, the key status flag, mentioned above, must indicate that the last key used was a valid or "GOOD" key. To enter the program mode the IGN input is switched to a logic "0", the PRO input is switched to a logic "1" and a valid key resistance is placed across the KEY terminals 12, 14 of the controller 10. After this initial set-up, the IGN line is switched to a logic "1" state. This sequence clears the controller's memory and places the system in the unprogrammed mode. The IGN line is then switched to a logic "0". To program the controller 10 to a new key resistance value the PRO line is switched to a logic "0" and the new valid resistance value placed across the KEY inputs 12, 14. If an invalid resistance value, a short or an open is placed across the KEY inputs 12, 14 the controller 10 will remain in the unprogrammed state. When IGN is switched to a logic "1" the controller will be programmed to the new resistance value. After this programming sequence the DIAG output will remain active. The DIAG output will return to its normal operating sequence with the next ignition cycle.

Figure 2:
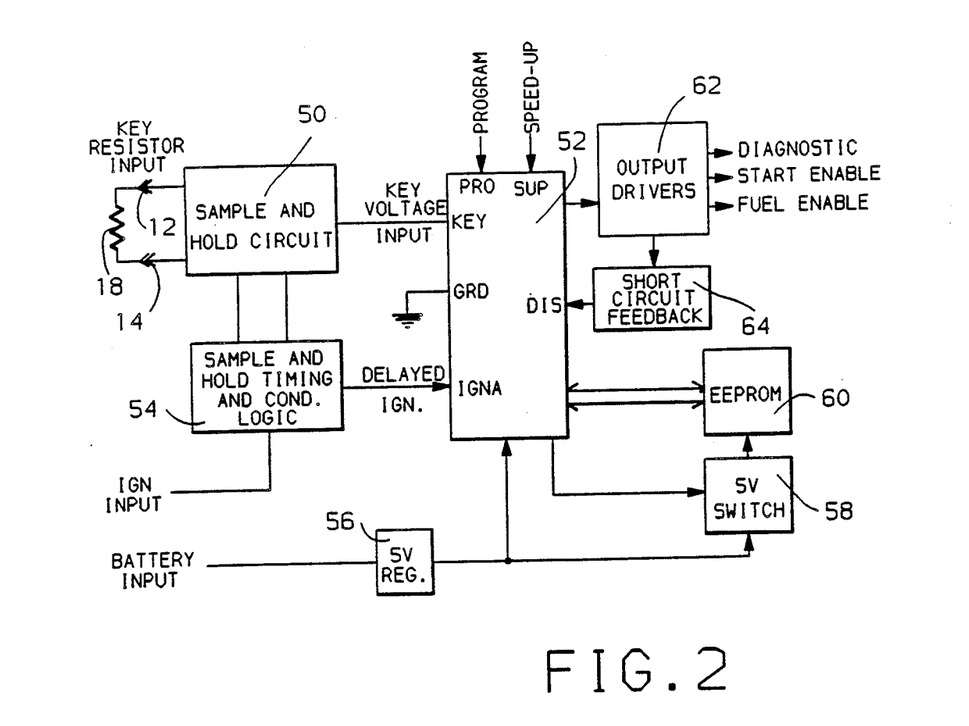
FIG. 2 is a more detailed block diagram of the system.

Referring now to FIG. 2, the module 10 is shown in greater detail to include an integrated circuit (IC) 52 receiving inputs from and providing outputs to various discrete circuits. The key resistor 18 is shown as providing input to a sample an hold circuit 50 which provides a key voltage input to the IC 52. The ignition switch 20 provides an input to sample and hold timing and conditioning logic 54 which produces a delayed ignition input to the IC 52. The battery 22 provides input to a voltage regulator 56 which provides a regulated 5 volt source for the IC 52 and to a switch 58 which is controlled from the IC 52 and provides voltage to an EEPROM 60. The EEPROM 60 stores a one bit Key Status code, which is updated each time a key is inserted in the ignition lock, and a Key Input code which is operator programmable. A Key Status code of "one" implies that the last key inserted in the ignition lock was a "good" key. A Key Status code of "zero" implies that the last key inserted in the ignition lock was a "bad" key. The Key Input code is a four bit code corresponding to one of fifteen resistor pellet variations as a percent of Vdd. For example the code 1110 may represent 13.1% to 15.4% of Vdd, while the code 0000 may represent 81.5% to 83.6% of Vdd. The code 1111 represents any other percentage of Vdd. The IC 52 controls output drivers 62 for the diagnostic, start and fuel output signals. The drivers 62 provide a input to the IC 52 through a short circuit feedback circuit 64 which monitors current through the drivers 62 and via the IC 52 turns the drivers 62 off in the event of a short circuit. When the ignition switch 20 is activated an A/D converter in the IC 52 takes a predetermined number of samples of the voltage developed across the ignition key resistor 18. The samples are compared with the digital code stored in the EEPROM 60. If a predetermined number of the samples, for example 53%, match the stored code the vehicle start and fuel circuits are enabled from the drivers 62. Otherwise the vehicle is disabled for approximately two minutes. Should the contacts 12, 14 in the ignition lock assembly intermittently open as a result for example of mechanical motion of the key cylinder or contact aging, the samples taken during the open contact time interval do not match the stored code and may result in a lock out condition even though the proper key is being used. This problem is addressed by the circuitry designated 50 and 54.

Figure 3A:
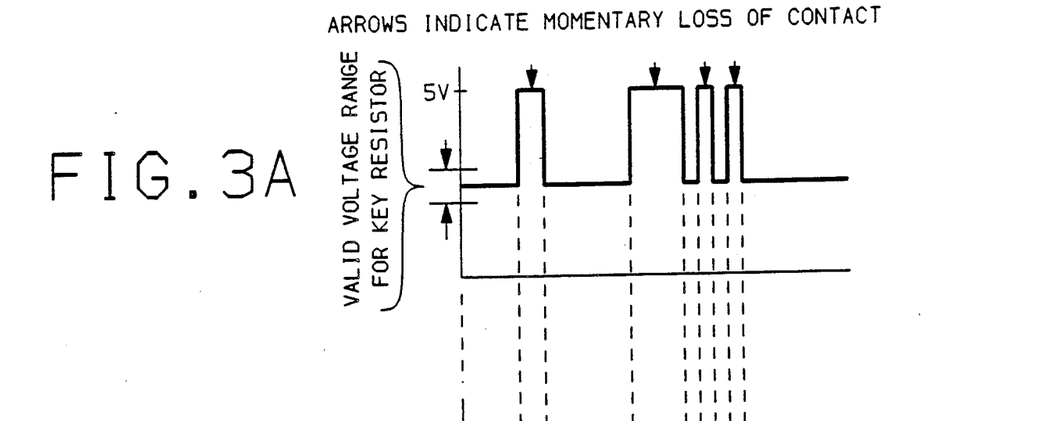
FIGS. 3A–3D are waveforms useful in explaining the intermittent contact detection and control function.
Figure 3B:
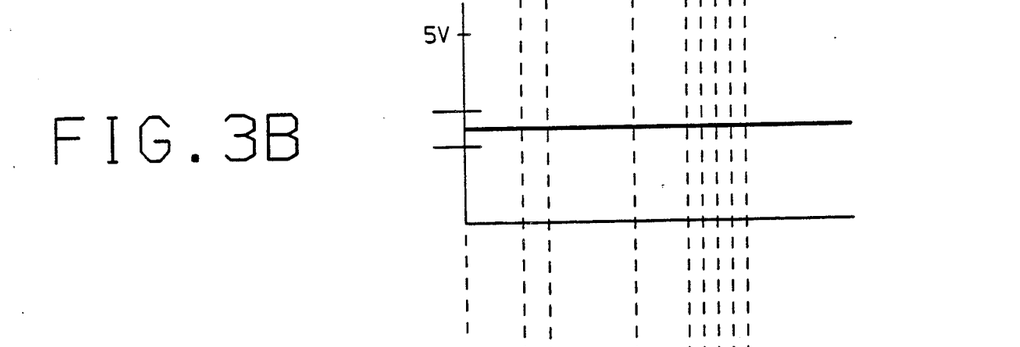
Figure 3C:
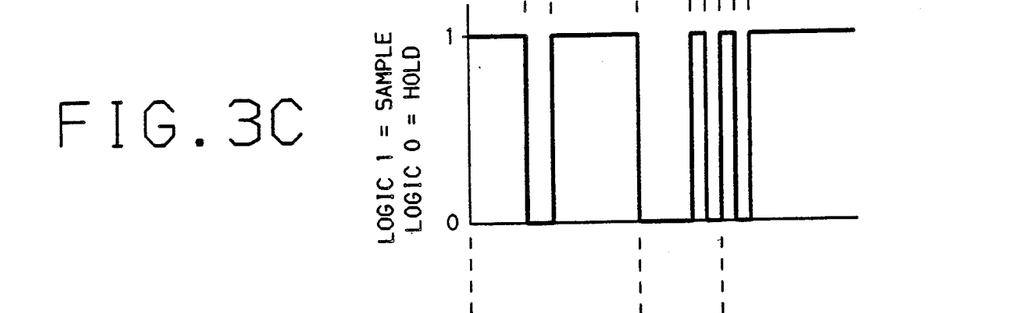

The sample and hold circuit 50 and the logic 54 compensate for intermittent contact loss within the key lock cylinder assembly in order to prevent false lockout of a valid key resistor. When a momentary loss of contact occurs as shown in FIG. 3A, the sample and hold circuit 50, "holds" the last valid key voltage that was seen at the key as indicated in FIG. 3B. When contact is regained, the sample and hold circuit resumes operation in a voltage follower mode tracking the voltage seen at the key. This switching is characterized in FIG. 3C. Therefore, the key voltage seen at the IC 52 tracks the key voltage, see FIG. 3D, as if no intermittent loss of contact had occurred.

Figure 3D:
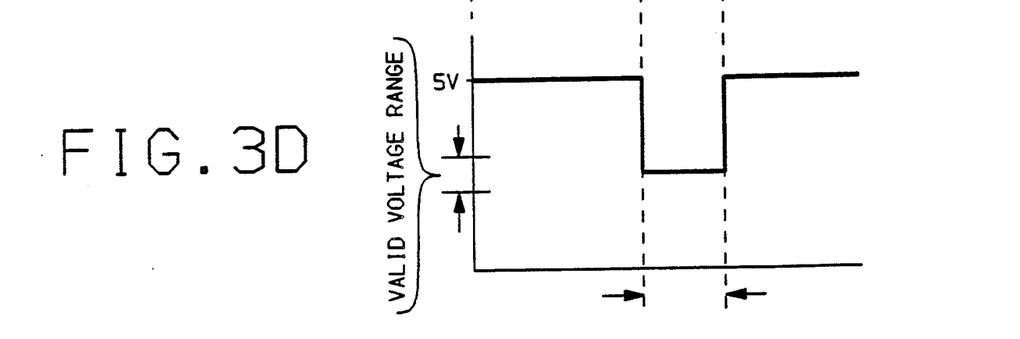

The logic 54 is provided to trigger the tracking and hold modes and to prevent the IC 52 from taking samples of the key voltage before a valid voltage is present. An ignition delay line is generated in the logic 54 which will only trigger the IC 52 to the ignition "on" mode if 40 ms or more of a valid key voltage is present as illustrated in FIG. 3D. This time allows the sample and hold circuit 50 to stabilize. If this condition is not met, the controller 10 remains inactive, i.e. no outputs are activated and no lockout implemented. Thus if the ignition key is activated while the key contact are open, no outputs will be activated.

The Speed-Up (SUP) input to the IC 52 is used to allow fast testing of the two minute timer within the IC 52. To enter the speed-up mode the last key status flag must indicate the last key measured was a valid or "GOOD" key value. IGN is switched to a logic "0" and SUP is switched to a logic "1". When IGN is switched to a logic "1" the timer interval will be reduced from 2 minutes to 2 seconds if the timer is activated. Once the controller is placed in the speed-up mode it will remain in that mode until the SUP line is switched to a logic "0" or there is a master reset (battery disconnected).

Figure 4:
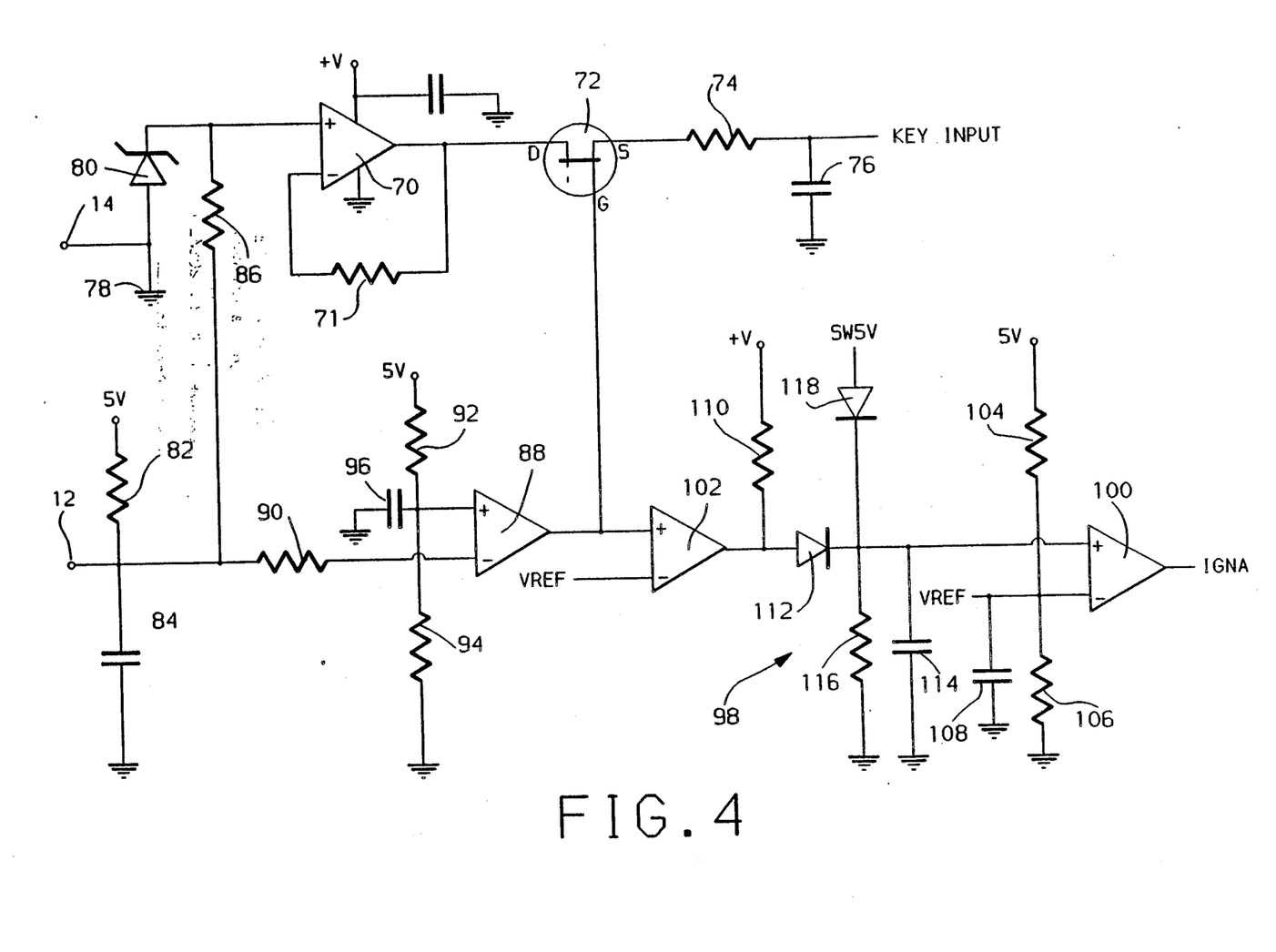
FIG. 4 is detailed schematic diagram of the sample and hold circuitry and timing and conditioning logic depicted in block form in FIG. 2.

Referring now to FIG. 4, detailed circuitry for implementing the function of blocks 50, and 54 is disclosed. The voltage across the key resistor is buffered by a unity gain amplifier 70. The output of the amplifier 70 is connected to the drain of FET 72 and to the negative input of amplifier 70 through feedback resistor 71. The source of FET 72 is connected to ground through an averaging circuit comprising resistor 74 and capacitor 76 which filters any switching transients. The junction between resistor 74 and capacitor 76 is connected to the key input to the IC 52. The positive input of amplifier 70 is connected to contact 14 and to IC ground 78 through a zener diode 80 which clamps the positive input, protecting against high voltage transients. The contact 12 is connected to a junction between a pullup resistor 82 and capacitor 84 which rejects any high frequency components. The contact 12 is also connected to the positive input of amplifier 70 through a current limiting resistor 86 and to the negative input of an amplifier 88 through a current limiting resistor 90. An amplifier 88 detects any out of range valued resistor across the inputs 12, 14 or the intermittent open circuit of the contact 12, 14. A reference voltage is established at the positive input of amplifier 88 by resistors 92, 94 and a parallel connected capacitor 96 is set just above the maximum voltage expected of the key resistors which might be placed across the contact 12, 14.

The output of amplifier 88 is connected to the gate of FET 72 and to a timer circuit generally designated 98. The timer circuit 98 comprises amplifiers 102 and 100. A reference voltage VREF is established at the negative terminal of amplifier 100 by voltage dividing resistors 104, 106 and capacitor 108 and is applied to the negative input of amplifier 98. An RC timing network comprises a charging resistor 110, diode 112, capacitor 114 and discharge resistor 116 is connected to the positive input of amplifier 100. The output of amplifier 100 is connected to the IGNA input of the IC 52.

The timer 98 provides a set delay of for example 30 msec. between the closure of the ignition switch 20 and the generation of the IGNA output which controls the IC 52. This allows for a finite stabilization time of the voltage across capacitor 76. Once the output IGNA is switched high, the timer 98 is latched by the application of a switched Vcc input though diode 118. Thus while the timer 98 controls turn on of the IC 52, it cannot subsequently turn the IC 52 off.

Under normal circumstances the voltage across the capacitor 76 is sampled by the IC 52 after time out of the timer 98. If an open circuit occurs across the contacts 12, 14 the output of amplifier 88 is driven low to disable the FET 72 so the most recent voltage on the capacitor is affected. Also, the amplifier 102 is switched to prevent further charging of capacitor 114 some discharging through resistor 116 will begin. Thus, intermittent opening of contacts 12, 14 will increase the delay on the IGNA output and once IGNA has switched will disable FET 72 during contact open. A digital implementation of the intermittent contact detect function of the circuits 50 and 54 may also be incorporated in the IC 52, if desired rather than in discrete form.

Figure 5:
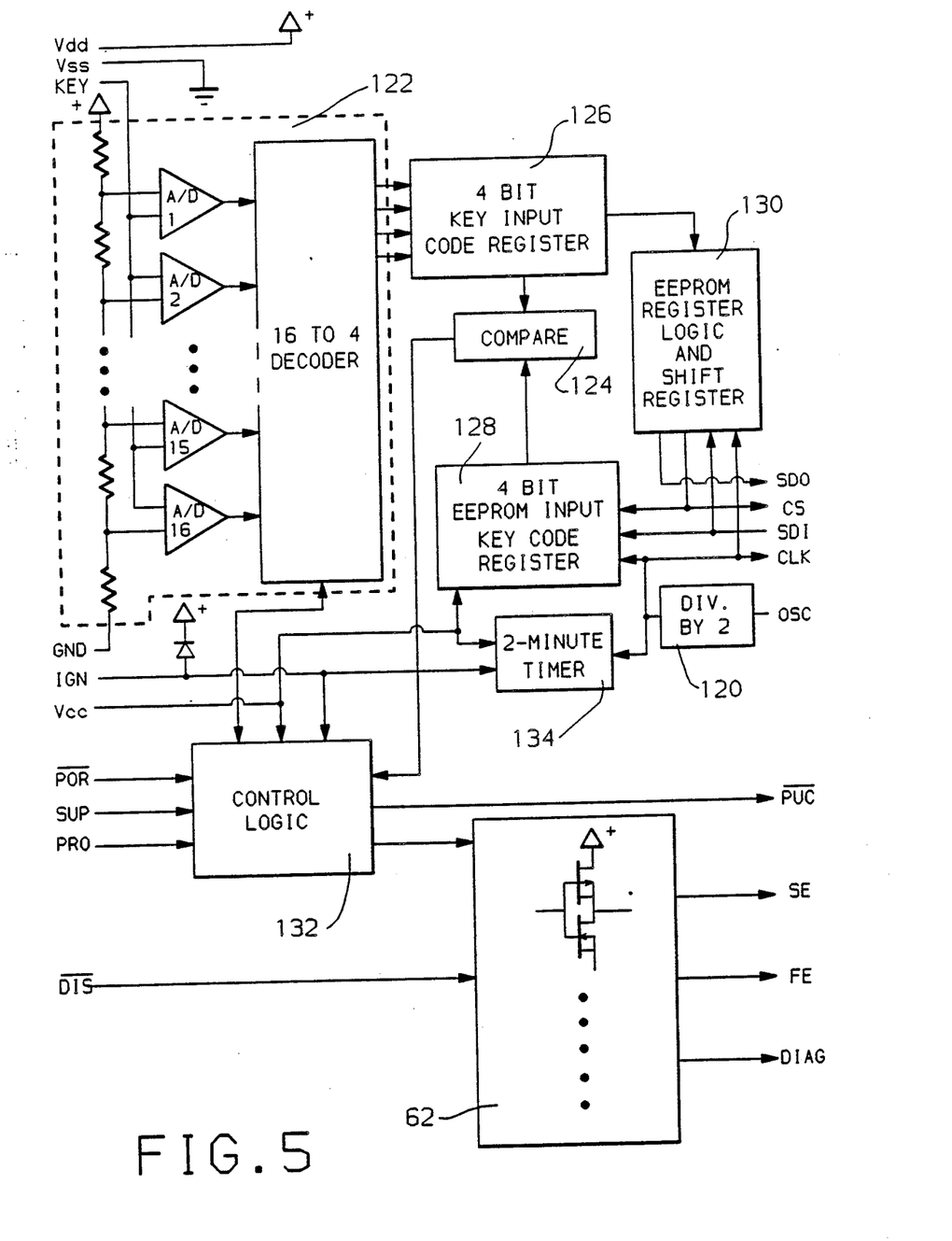
FIG. 5 shows a more detailed block diagram of the integrated circuit depicted in block form in FIG. 2.

Referring now to FIG. 5, a more detailed block diagram of the IC 52 is shown. The IC 52 includes a divider 120 which divides a 16 kHz ramped input signal OSC from an external RC oscillator. The divider 120 squares up the input signal and provides an system clock to drive the various components of the controller 10. A flash Analog to Digital (A/D) converter generally designated 122 converts a voltage corresponding to the value of the resistor pellet 18 to a four bit keycode.

Compare logic 124 performs a parallel comparison between the 4-bit A/D word stored in a key input code register 126 and the 4-bit key code read from the EEPROM 60 to an input key code register 128. Select logic 130 provides Chip Select control CS and communication with the EEPROM 60 under control of control logic 132 which directs all operations within the controller 10. The logic 130 includes a serial Shift Register which provides a serial communication path to and from the EEPROM via Serial Data In SDI, and Serial Data Out SDO lines. A Power Up Control PUC output responds to IGN and is used to drive a transistor switch which permits the EEPROM 60 and the Vcc supply to power up. The Program (PRO) input to the IC 52 controls the programming of the EEPROM. To enter the program mode PRO is enabled and a Good Key input cycle is performed to determine whether the last key was good or bad.

The compare logic 124 also detects if the EEPROM is unprogrammed (code 1111) and if so signals Control Logic 132 that a Write Keycode (WK) operation is needed. When the WKL operation is latched in by the Control Logic 132, the first sample from the A/D is stored in the register 128. The remaining samples are loaded into the register 126 and compared with the first sample. Unless 90% of the samples match a new sample is passed in and the process is repeated until 90% of the samples match, at which time the code designated Good Key (GK) code is written to the EEPROM. Once the GK code is written to the EEPROM the WKL flag will no longer be set because all "ones" are no longer read from the EEPROM. If a blank key or no key is read while the EEPROM is an unprogrammed, the code (1111) will be written back to the EEPROM keeping the controller unprogrammed. If the controller is programmed, a blank key or no key will always be read as a Bad Key (BK). The output of the compare logic 124 indicates whether the content of the first and second registers are equal and is applied to 2 minute timer logic 134.

The Control Logic 132 directs all incoming signals and sets up the proper communications or operations as needed. The control unit 132 is a pseudo PLA (NOR-NOR) that latches information before the first NOR plane and before the second NOR plane. As the incoming commands arrive in an asynchronous manner, they are latched and sorted by priority in the first plane, and then allowed to pass on to the second plane. The second plane latches in the function and holds it until the operation decoded by the second plane NORs is complete. Once complete, the next operation waiting in the first plane will be latched in and performed. The Control Logic 132 handles various functions or operations needed for communication with EEPROM 60. These functions and a brief description of each are described below.

A Read Key (RK) operation is set by IGNA (Delayed Ignition) going high. This function is performed on every ignition cycle to determine if the key being used should start the car. The EEPROM 60 is accessed for the Keycode which is then compared to the Key Input Code to determine whether a valid or invalid key is being used.

A Read Key status operation (RKS) is performed during a power up, Master Reset (MR). This is the only function that has priority over the RK function. If the Status indicates a good key, the RK function will follow, but if the Status indicates a bad key, no further operations are allowed and the 2 minute timeout is set up and will start when Ignition goes low.

A Write Enable operation (WEN) is done to prepare the EEPROM 60 for a write. The WEN function is performed if the present key being read during a RK function is different than the last key read. The WEN function is also performed if the PRO pin is high indicating that the EEPROM 60 is about to be erased or is unprogrammed and needs to be programmed.

An Erase Keystatus bit operation (EKS) is done after the WEN when the Keystatus needs to be written to the EEPROM 60. Before the Write can occur, the old word is first erased. This operation is also done upon a change in Key Status (DKS) but is prevented if a Write Keycode Function (see below) is or will be done.

A Write Keystatus operation (WKS) is performed after the EKS operation is done. This function writes the keystatus information to the EEPROM 60. The WEN and EKS functions are done before the WKS cycle.

A Write Keycode operation (WK) is set when all 1's are read from the EEPROM during the RK operation. The write keycode directly follows the WEN cycle. An erase need not preceed the WK function because the unprogrammed EEPROM 60 is at an all 1 state.

An Erase All operation (ERA) is initiated if the Program pin PRO is set high and a good key reading occurred during the RK cycle. This is a separate cycling of ignition used to return a programmed module back to an unprogrammed status.

A Write Disable operation (WDIS) is performed by any of the cycles WK, WKS, or ERA. The write disable follows any of the write operations to complete the write cycle to the EEPROM 60.

Figure 6A:
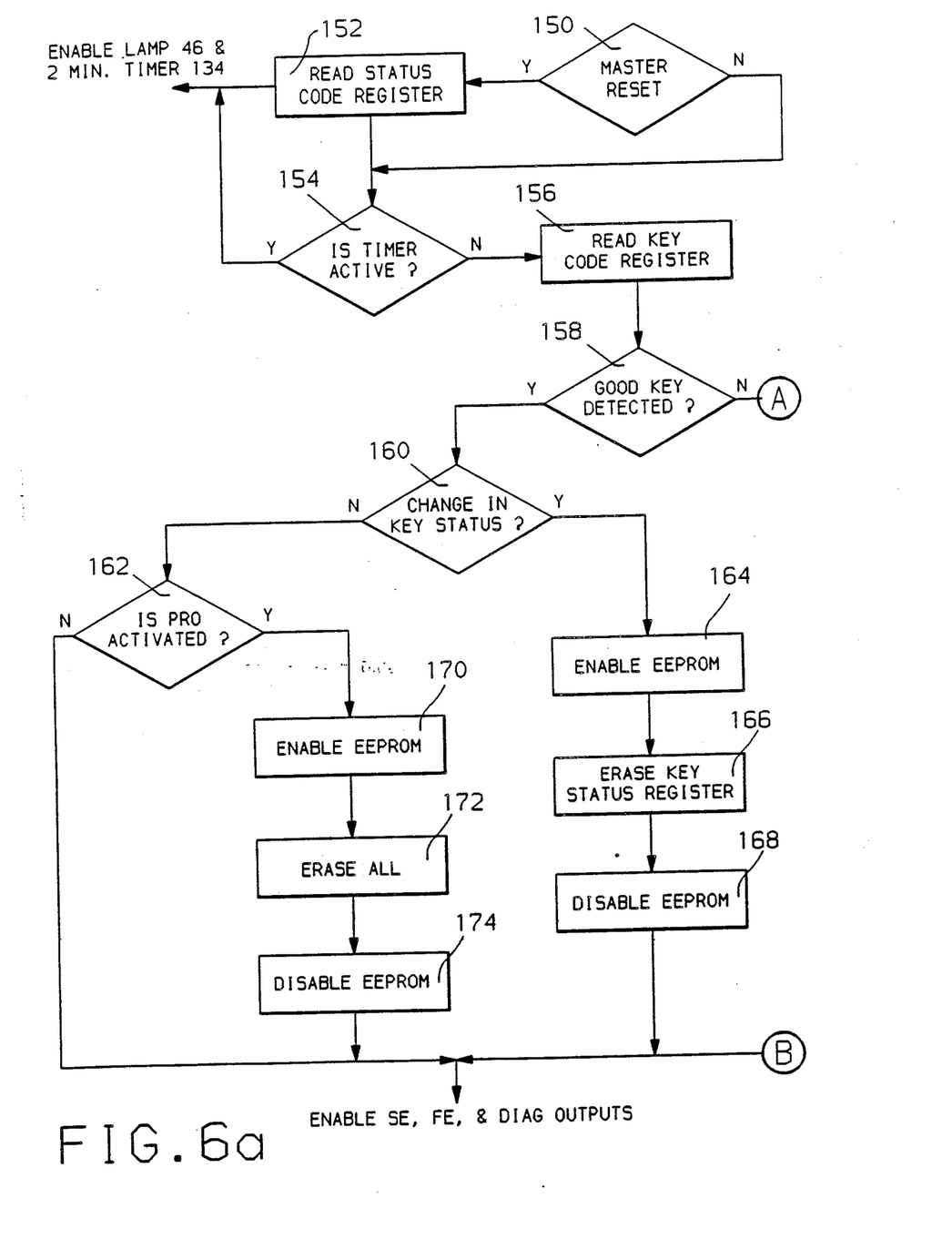
FIGS. 6A–6B are an overall functional flow chart of the operation of the controller of the system.
Figure 6B:
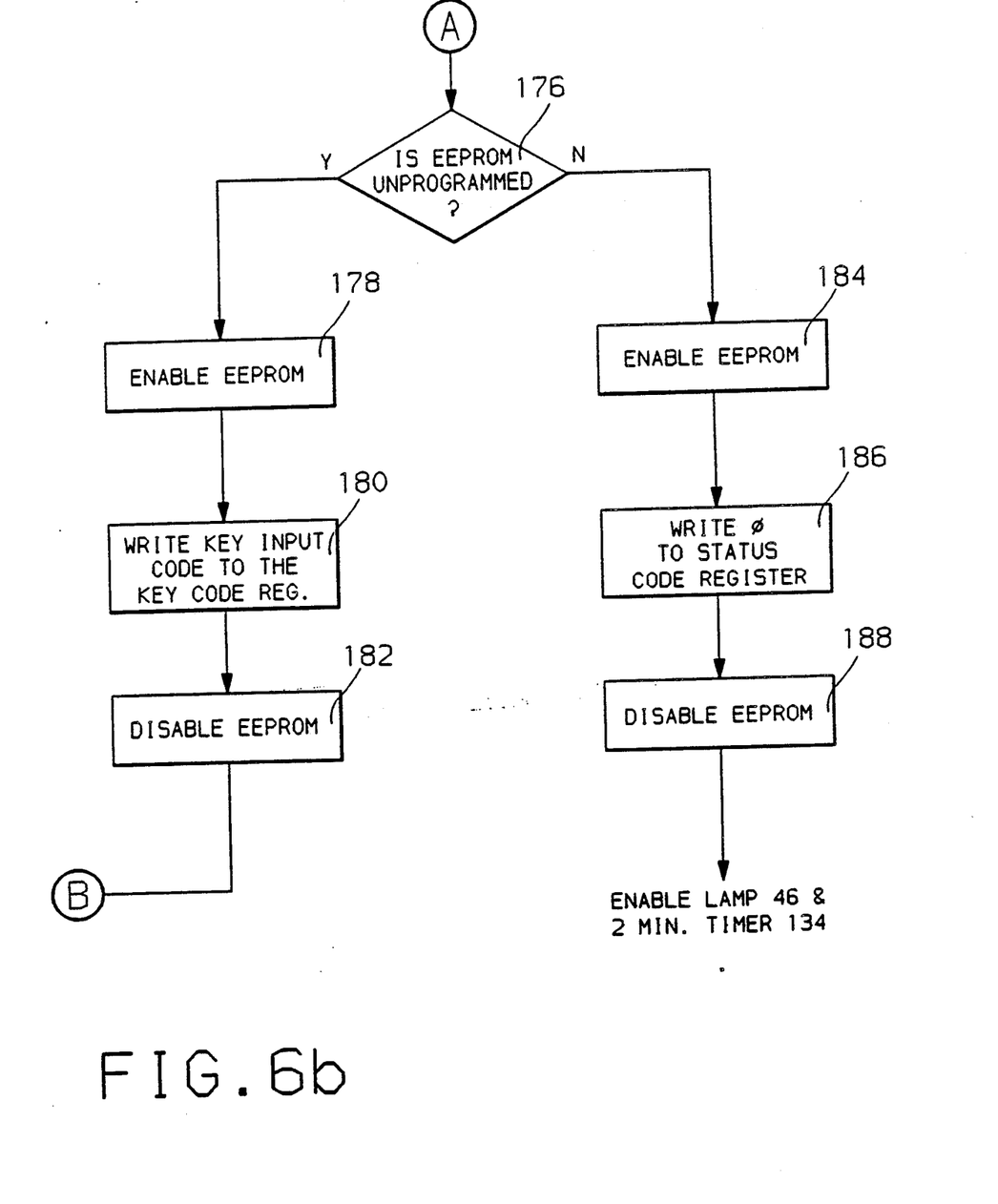

Referring to FIGS. 6A and 6B, a functional flow chart showing the overall operation of the system is disclosed. When power is first applied, a Master Reset (MR) discrete is generated, which initializes all logic to a known state including setting a Read Key Status (RKS) Flag. Thereafter, when the ignition input goes high, power is applied to the EEPROM 60, and a Read Key (RK) Flag is set. The timer 134 is not activated on initial power up so the RKS Flag is in a set state, the status of the Key is read and the RKS Flag is reset which produces a Good Key (GK) output. If a Master Reset, indicated at 150 in FIG. 6, occurs the Status Code register is read at block 152. If the code is 0, i.e. the last key measured was a bad key the diagnostic lamp is enabled and the two minute timer is enabled. As indicated at 154, if the code is a 1, i.e. last key was a good key, then if the timer is active the lamp and timer are enabled, otherwise the key code from the EEPROM 60 is read to the IC 52 as indicated at 156. As indicated at 158, if the comparison shows a good key is present, then if there has been no change in the key status (160) and the program pin is not activated (162) the SE, FE outputs are enabled and the lamp is temporarily enabled. If instead, there has been a change in key status, then the EEPROM 60 is enabled (164), the key status is erased (166) producing a logic 1, and the EEPROM is disabled (168) and the SE, FE, and DIAG output are enabled. If the program pin is activated, the EEPROM is enabled (170), erased (172) produce all 1's and the EEPROM is disabled (174) and the SE, FE, and DIAG output are enabled. As indicated at 176, if a bad key is detected and the EEPROM is unprogrammed (all 1's) the EEPROM is enabled (178), the code corresponding to the value of the resistor between the contact 12, 14 is written (180) to the key code register in the EEPROM, the EEPROM is disabled (182) and the SE, FE, and DIAG output are enabled. If a bad key is detected while the EEPROM is programmed (key code other than all 1's), then the EEPROM is enabled (184), a 0 is written (186) to the status code register in the EEPROM, the EEPROM is disabled (188) and the lamp and two minute timer are enabled. The SE and FE outputs remain disabled.

The embodiments of the invention in which an exclusive property or privilege is claimed are defined as follows:

1. A programmable security system for a device having a lock operable by a key, comprising erasable memory means for storing a code associated with a valid key and for storing a key status code indicative of whether the previous attempt to operate the lock was initiated with a valid key or an invalid key, means for reading an input key code in response to a predetermined step in the operation of the lock by said key, means for comparing the input key code with the stored key code to permit operation of the device when the input key code matches the stored key code and the key status code indicates that the previous attempt to operate the lock was initiated with a valid key.

2. The system of claim 1 further comprising a timer which is activated to prevent operation of the device for a predetermined time interval in the absence of said match, and means for updating the status code to indicate whether the attempt to operate the lock was initiated with a valid or an invalid key.

3. The system of claim 1 wherein the device is a motor vehicle, the lock is an ignition lock and the key is an ignition key containing a resistor pellet carried by the key, said ignition lock including contacts which are engaged by the resistor pellet when the key is inserted in the lock, and the means for reading the input key code includes means responsive to intermittent contact loss between said pellet and said contacts for preventing a change in the input key code during said loss.

4. The system of claim 1 wherein the erasable memory means may be placed in a predetermined initialized state in response to a program input if the attempt to operate the lock is initiated by a valid key and there is no change in said status code, said memory means being reprogrammed to the value of the input key code upon the next attempt to operate the lock.

5. The system of claim 1 wherein the key contains a resistor pellet, and the lock includes contacts which engage the pellet when the key is inserted in the lock, said system further comprising analog to digital converter means for sampling and converting the value of the resistor pellet to one of a predetermined number of key codes including a code which represents either an invalid key or disengagement of said contacts with said resistor pellet, means for accepting the value of the resistor pellet as valid only if a predetermined number of samples of the resistor value correspond to one of the key codes excluding the code representing an open contact condition.

6. The system of claim 3 wherein the means for reading the input key code is an integrated circuit, the input key code is a voltage corresponding to the value of the resistor pellet, said means responsive to intermittent contact loss comprises sample and hold means for holding the voltage value sampled prior to loss of contact between said pellet and said contacts when contact loss is less than a predetermined time interval.

7. The system of claim 6 wherein the means responsive to intermittent contact loss further comprises timing and conditioning logic for controlling said sample and hold means to prevent sampling of the input key code voltage for a predetermined time interval following activation of the ignition key.

8. The system of claim 7 wherein the erasable memory means is an EEPROM.

9. In a programmable security system for a motor vehicle having an ignition lock operable by an ignition key containing a resistor pellet, the ignition lock including contacts which are engaged by the resistor pellet when the key is inserted in the lock, the improvement comprising erasable memory means containing a first register for storing a key code and a second register for storing a first key status code if a valid key was used on the previous attempt to operate the lock and a second key status code if an invalid key was used on the previous attempt to operate the lock, analog to digital converter means for sampling and converting the value of the resistor pellet to one of a predetermined number of input key codes, means of accepting the value of the resistor pellet as valid only if a predetermined number of samples of the resistor value corresponds to one of said predetermined key codes, means for comparing the input key code with the stored key code to permit operation of the motor vehicle if the input key code matches the stored key code unless an invalid key was used in the previous attempt to operate the lock and a predetermined interval of time has not passed since the previous attempt.

10. A programmable security system for a device having a lock operable to a key, comprising erasable memory means for storing a code associated with a valid key, said memory means including status code storage means for storing a key status code indicative of whether an attempt to operate the lock was initiated with a valid key or an invalid key, means for reading an input key code in response to a predetermined step in the operation of the lock by said key, means for comparing the input key code with the stored key code to permit operation of the device when the input key code matches the stored key code, timer means, means for activating said timer means to prevent operation of the device for a predetermined time interval when the input key code does not match the stored key code, means responsive to application of power to said system for activating said timer means if said status code storage means indicates that the last attempt to operate the lock was initiated with an invalid key.

* * * * *